United States Patent [19]
Sakai

[11] 3,937,476
[45] Feb. 10, 1976

[54] REPRODUCING APPARATUS FOR A DISC TYPE RECORD MEDIUM

[75] Inventor: Masaaki Sakai, Tokyo, Japan

[73] Assignee: Sony Corporation, Tokyo, Japan

[22] Filed: Dec. 17, 1973

[21] Appl. No.: 424,929

[30] Foreign Application Priority Data
Dec. 28, 1972 Japan.................................. 48-1723

[52] U.S. Cl. ............... 274/39 A; 274/1 R; 274/1 F; 274/23 R; 318/311
[51] Int. Cl.² .................... G11B 17/00; G11B 3/60; H02K 27/20; 7/00
[58] Field of Search......... 274/1 E, 1 F, 23 R, 39 A, 274/1 R; 318/311

[56] References Cited
UNITED STATES PATENTS

| | | | |
|---|---|---|---|
| 2,113,226 | 4/1938 | Young................................ | 274/1 F |
| 3,105,692 | 10/1963 | Berggren............................. | 274/1 F |
| 3,319,965 | 5/1967 | Wolf................................... | 274/39 A |
| 3,503,615 | 3/1970 | Matsuda.............................. | 274/1 R |

FOREIGN PATENTS OR APPLICATIONS

| | | | |
|---|---|---|---|
| 814,859 | 8/1937 | France................................ | 274/1 R |

Primary Examiner—Richard E. Aegerter
Assistant Examiner—Steven L. Stephan
Attorney, Agent, or Firm—Hill, Gross, Simpson, Van Santen, Steadman, Chiara & Simpson

[57] ABSTRACT

A sound reproducing apparatus includes a device for producing an output signal proportional to the rotary angle of a rotary shaft which rotates in association with the pickup arm of a phonograph apparatus, and includes a motor speed control circuit for driving a turntable in response to the output signal and a reference signal which is determined from monitoring the position of the sound track on a disc record. The position detecting device is able to detect the amount of eccentricity of the disc record or the spindle of the turntable and the invention improves the wow characteristics of phonograph apparatus caused by eccentricity.

9 Claims, 21 Drawing Figures

REPRODUCING APPARATUS FOR A DISC TYPE RECORD MEDIUM

BACKGROUND OF THE INVENTION

1. Field of the Invention

The present invention relates generally to a sound reproducing apparatus for a disc type record medium, and more particularly to a sound reproducing apparatus for a disc type record medium which is suitable for reproduction of sound from a disc record having eccentricity.

2. Description of the Prior Art

Generally speaking, in a disc record medium such, for example, as a record and the like, at times the center of the spiral sound track groove is not in coincidence with the central bore of the record. Also, sometimes the center bore of the record disc does not coincide with the rotational axis of the spindle of a turntable.

A wow results in such cases in the output signal which deteriorates the sound quality. Tests have shown that if the center of a record disc is shifted by, for example, 0.2 mm, wow of 0.134% occurs on the outer periphery of the disc record and wow of 0.402% occurs on the inner periphery of the record disc (which is 50mm in radius).

SUMMARY OF THE INVENTION

An object of the present invention is to provide a sound reproducing apparatus for a disc type record medium which is free from the drawbacks of the prior art.

Another object of the invention is to provide a sound reproducing apparatus for a disc type record medium suitable for reproduction of sound from a disc record which has eccentricity.

A further object of the invention is to provide a sound reproducing apparatus for a disc type record medium in which the change of rotational angle of the tone arm is detected to control the speed of rotation of the turntable in a record player to avoid the drawbacks of the prior art.

A still further object of the invention is to provide a sound reproducing apparatus for a disc type record medium in which the angle change of the tone arm supporting rotational shaft is detected and controls a speed servo motor in response to the detected output.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
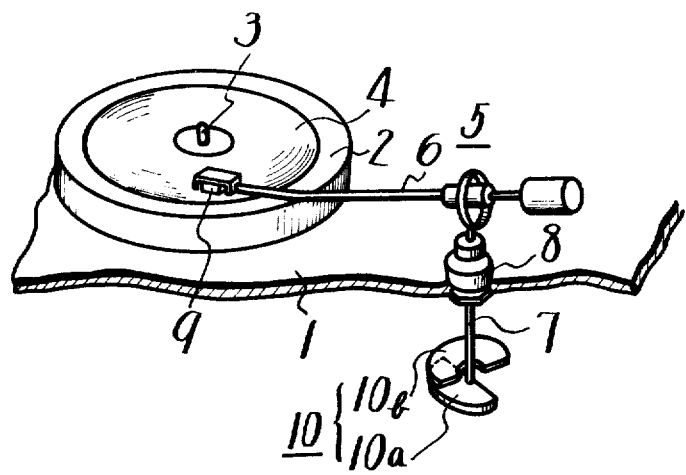
FIG. 1 is a perspective view for showing the main part of an example according to the present invention.

A first example of the present invention will be described with reference to FIGS. 1 and 2. In FIG. 1, a support board 1 of a record player has a turntable 2 and spindle 3. A disc record medium, such as a record disc 4, is mounted on the turntable. A pickup arm mechanism 5 includes a pickup arm 6. A rotary shaft 7 is mounted substantially perpendicular to and supports the pickup arm 6. A bearing 8 is mounted in board 1 and rotationally supports the rotary shaft 7. A cartridge 9 is attached to the free end of the pickup arm 6.

A detecting device 10 is mounted so as to detect the changes of the rotation angle of the pickup arm 6 while the cartridge traces the spiral groove or modulation groove formed on the record disc 4. The speed of a motor, which drives the turntable 2 and which will be described later, is controlled by the output of the detecting device 10.

The detecting device 10 consists of two semi-circular shaped discs 10a and 10b made of metal plate. Plate 10a is attached to the rotary shaft 7 and forms a rotor. Plate 10b is fixed to a support and forms a stator. Plates 10a and 10b form a variable capacitor. Thus, the changes in the angular velocity of the rotary shaft 7 can be detected as a change in capacitance of the variable capacitor. In other words, the changes of the rotation angle of the rotational shaft 7, which is proportional to the distance that the cartridge 5 travels on the record disc 4 from its outer periphery to its inner periphery, is detected as capacity changes of the capacitor formed by the two semi-circular plates 10a and 10b.

Figure 2:
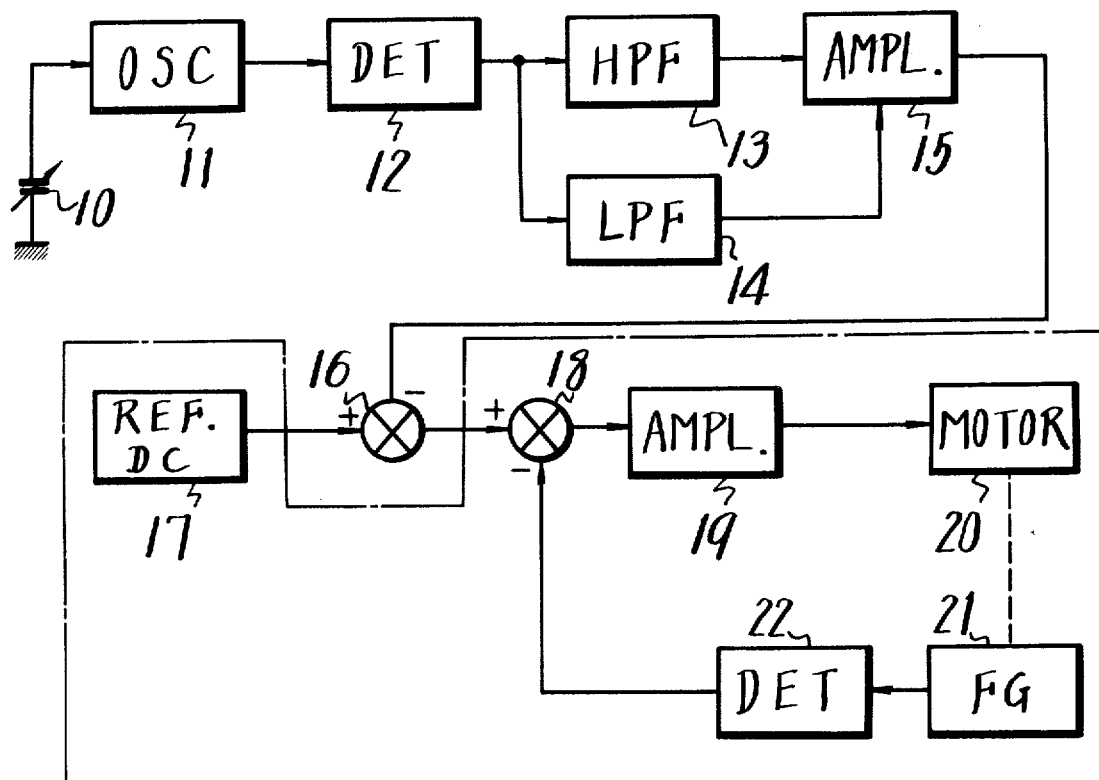
FIG. 2 is a circuit diagram used in the example shown in FIG. 1.

FIG. 2 is a circuit diagram in block used with the reproducing apparatus shown in FIG. 1. The detecting device 10 which is the variable capacitor formed of two semi-circular plates 10a and 10b in FIG. 1 is connected to an oscillator 11 and controls its oscillation frequency. The output terminal of the oscillator 11 is connected to the input terminal of a frequency discriminator or detector 12. The output of detector 12 is connected to the input terminals of a high pass filter 13 and to a low pass filter 14, respectively. The pass band frequency of the high pass filter 13 is selected as 0.56 Hz for a long play record (L.P.) of 33⅓ r.p.m. The output terminal of the high pass filter 13 is connected to the input terminal of a variable gain amplifier 15. The output terminal of the low pass filter 14 is connected to the gain control terminal of variable gain amplifier 15. The output terminal of amplifier 15 is connected to a speed servo circuit 40.

The speed servo circuit 40 consists of a frequency generator 21 which may produce pulse signals, which are proportional to the rotational speed of drive motor 20 which drives the turntable 2. A frequency discriminator or detector 22 is connected to and detects the output pulses from the frequency generator 21. A reference DC voltage source 17 supplies an input to adder 16 which receives the output of amplifier 15. A comparator 18 receives the output signal from the adder 16 and the output of frequency discriminator 22. A DC amplifier 19 is controlled by the output signal from the comparator 18 and supplies an output to control the speed of rotation of motor 20. In practice, the speed servo circuit 40 is well known, and the speed servo circuit 40 is formed so that the rotation speed of motor 20 can be controlled by the setting of reference DC voltage source 17.

In this case, the output signal from the variable gain amplifier 15 is superimposed on the reference DC voltage source 17 in adder circuit 16.

Figure 3A:
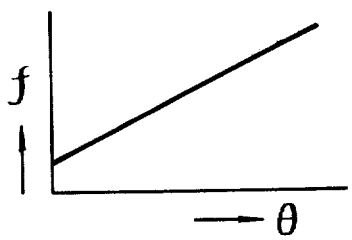
FIGS. 3A through 3E and 4A through 4E, inclusive, are graphs and waveform diagrams used for the explanation of the example of the invention.
Figure 3B:
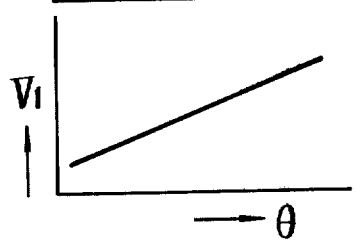
Figure 3C:
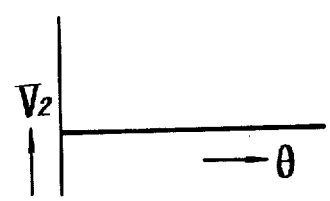
Figure 3D:
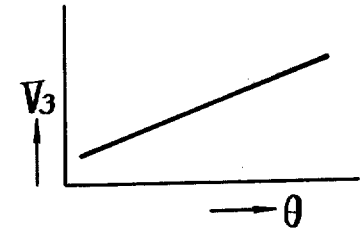
Figure 3E:
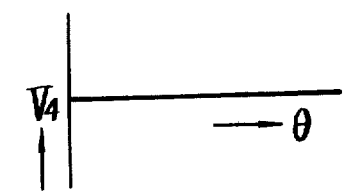

In operation, let it be assumed that the center of the spiral groove on the record disc 4 coincides with the center of the record disc 4 which means there is no eccentricity between them. In this case, as shown in FIG. 3A which is a plot, the oscillation frequency $f$ (on the ordinate) of the output signal from the oscillator 11 changes linearly with the rotation angle of the pickup arm 6 and rotary shaft 7 from the outer periphery of record disc 5 to its inner periphery. The rotation angle $\theta$ is plotted on the abscissa. Accordingly, as shown in FIG. 3B, the output voltage $V_1$ (on the ordinate) from the frequency discriminator 12 changes linearly with the rotation angle $\theta$ and hence the high pass filter 13 produces no output voltage $V_2$ (on the ordinate), as shown in FIG. 3C, while the output voltage $V_3$ (on the ordinate) from the low pass filter 14 changes linearly, as shown in FIG. 3D. Accordingly, since the high pass filter 13 produces no output signal, the variable gain amplifier 15 produces no output signal $V_4$ (on the ordinate), as shown in FIG. 3E. Therefore, the adder circuit 16 is supplied only with the output from the reference DC voltage source 17 and hence the motor 20 is driven at a fixed predetermined speed.

Figure 4A:
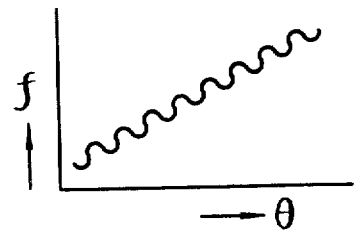
Figure 4B:
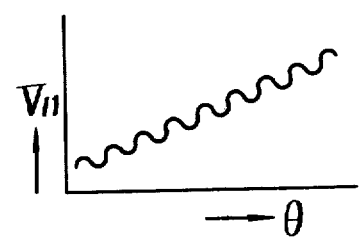
Figure 4C:
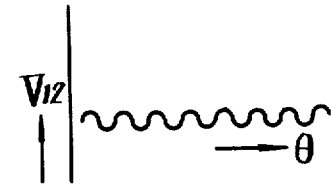
Figure 4D:
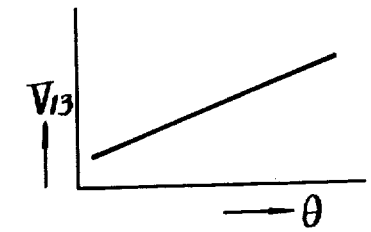
Figure 4E:
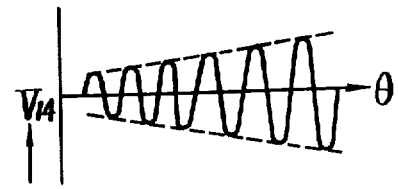

When an eccentricity exists in the record 4 or spindle 3, the velocity of the pickup arm 6 does not change linearly from the periphery of record disc 4 to its inner limit and the arm moves from the outer periphery to the inner limit of record disc 4 with an amplitude variation corresponding to the amount of eccentricity on every revolution of record disc 4. Accordingly, the oscillation frequency $f$ of the output signal from the oscillator 11 consists of a DC component and an AC component superposed on each other, as shown in FIG. 4A. Hence, the output signal $V_{11}$ from the frequency discriminator 12 is as shown in FIG. 4B. The output signal $V_{11}$ shown in FIG. 4B is filtered by the high pass filter 13 to obtain signal $V_{12}$ shown in FIG. 4C which contains only the AC component. This AC component is supplied to the variable gain amplifier 15. The signal $V_{11}$ is filtered by the low pass filter 14 to obtain signal $V_{13}$ shown in FIG. 4D which contains only the DC component. This signal is supplied to the control terminal of the variable gain amplifier 15. Thus, the variable gain amplifier 15 produces an output signal $V_{14}$ which is shown in FIG. 4E. In this case, the reason why the output signal from the amplifier 15 is increased in amplitude with an increase in $\theta$ is that the eccentricity has a greater effect the inner limit of record disc 4 than it does on the outer periphery thereof. The adding circuit 16 is supplied with the output signal from the amplifier 15 shown in FIG. 4E and controls the rotational speed of motor 20 in response to the output signal from the amplifier 15. In other words, when eccentricity exists in the record disc 4, the tracking speed of the cartridge 9 on the record disc 4 at the reproducing point changes in response to the waveform shown in FIG. 4E.

Accordingly, the adding circuit 16 is supplied with the signal from the amplifier 15 in a direction so as to cancel this effect. The rotation speed of motor 20 is changed in response to the eccentricity signal; and hence, the tracking speed of the cartridge 9 at the reproducing point on the record disc 4 is kept constant and wows which would have been caused by eccentricity will be eliminated.

As apparent from the above description, with the present invention since wows caused by eccentricity of records are eliminated, the reproduced sound will have superior fidelity.

Figure 5:
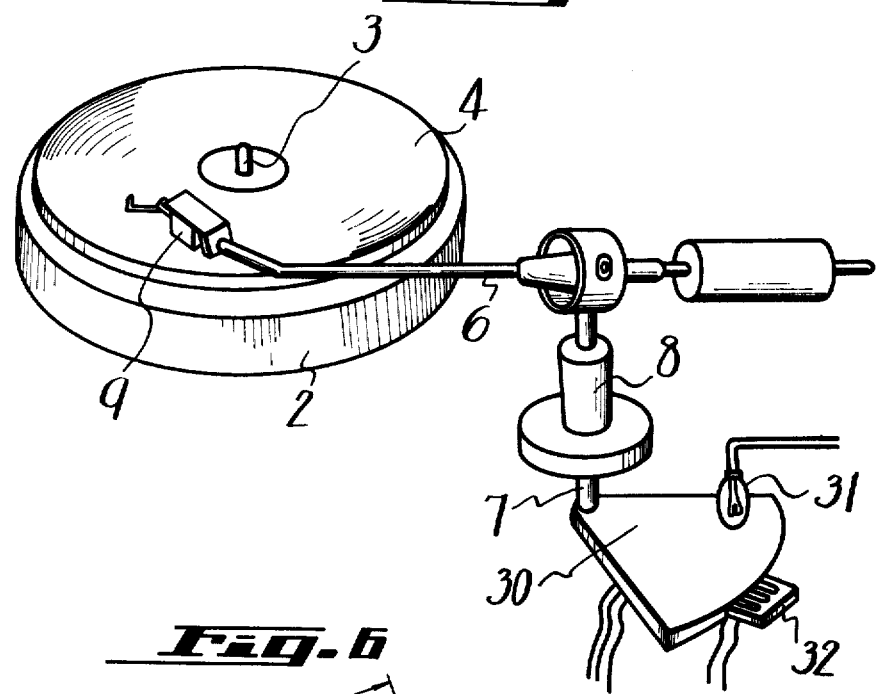
FIG. 5 is a perspective view for showing the main parts of another example according to the invention.

Another example of the invention will be described with reference to FIG. 5. In FIG. 5, reference numerals for elements the same as those of FIG. 1 indicate the same elements, and their description will be omitted.

The novel feature of the example shown in FIG. 5 is that a signal proportional to the rotation angle $\theta$ of the pickup arm 6 or rotaty shaft 7 is provided by a photoelectric apparatus. A shutter plate 30 of sector or fan shape is attached at its apex to the rotary shaft 7 of pickup arm 6. A light source 31, which may be an electric lamp 31, is mounted on one side of shutter 30 and a photoelectric pick up 32 is mounted on the other side and aligned with lamp 31, with the shutter 30 therebetween. The pickup 32 extends radially so that a variable output can be obtained which varies with the position of the shutter 30.

Figure 7:
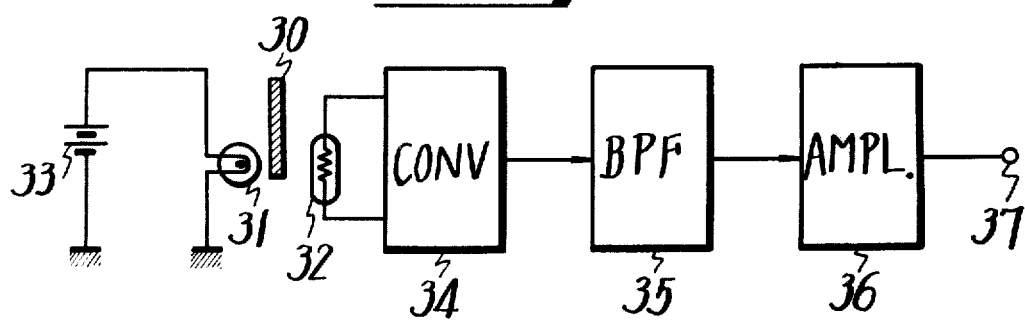
FIG. 7 is a circuit diagram used in the example shown in FIG. 5.

As shown in FIG. 7, the output signal from the photoelectric pickup element 32 is applied to a current-voltage converter 34 and its output is applied through a band pass filter 35 to a DC amplifier 36. The output delivered to output terminal 37 from the amplifier 36 is fed to the adding circuit 16 shown in FIG. 2. In FIG. 7, reference numeral 33 indicates a power supply for the lamp 31.

Figure 6:
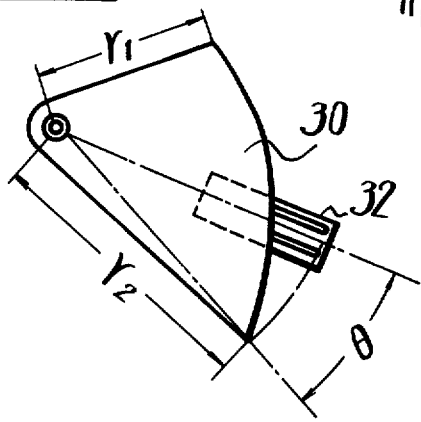
FIG. 6 is an enlarged view for showing a part of that shown in FIG. 5.
Figure 8A:
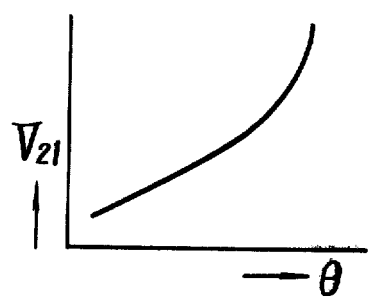
FIGS. 8A through 8C and 9A through 9C, inclusive, are graphs and waveform diagrams used for the explanation of the example shown in FIG. 5.
Figure 8B:
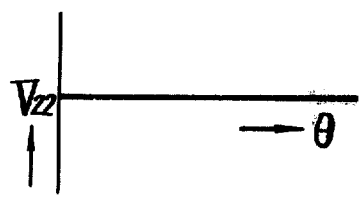
Figure 8C:
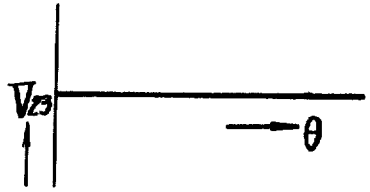

As shown in FIG. 6, the radius of shutter 30 changes exponentially from $r_1$ to $r_2$ ($r_1 > r_2$) and when no eccentricity exists in, for example, the record 4, the converter 34 produces an output signal $V_{21}$ which changes with the rotation angle $\theta$ as shown in FIG. 8A. The band pass filter 35 produces no output $V_{22}$ under these conditions as shown in FIG. 8B. Accordingly, the DC amplifier 36 produces no output signal $V_{23}$ as shown in FIG. 8C and hence the motor 20 is driven at a constant speed.

Figure 9A:
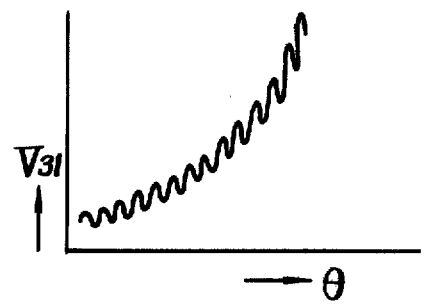

On the other hand, when an eccentricity exists in, for example, the record 4, the converter 34 produces a rippled output signal $V_{31}$ which contains a DC component and an AC component superposed on each other and which changes $\theta$ as shown in FIG. 9A. In this case, the amplitude of the AC component increases as the pickup arm 6 moves from the outer periphery to the inner limits of the record 4. This variation is caused by the specific contour of shutter 30, especially its outer periphery, as shown in FIG. 6. Thus, in the example of FIG. 5, the variable gain amplifier 15 shown in the example of FIG. 1 can be omitted.

The reason why the condition ($r_1 > r_2$) is satisfied in this case in that since the effect of eccentricity or wow is greater at the inner limits of the sound track of record 4 than at the outer periphery thereof, the change in tracking speed of cartridge 9 caused by the eccentricity is made to be greater as the cartridge 9 approaches the inner limit of the sound track on record 4.

Figure 9B:
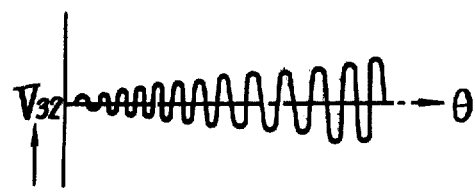
Figure 9C:
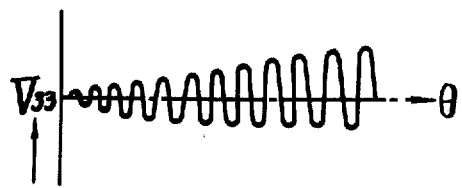

The DC component of the output from the converter 34 is eliminated by the band pass filter 35 as shown by signal $V_{32}$ in FIG. 9B and hence the DC amplifier 36 produces an output signal $V_{33}$ as shown in FIG. 9C. The output signal delivered to the output terminal 37 from the amplifier 36 is applied to the adder circuit 16 shown in FIG. 2 in opposite polarity to control the rotational speed of motor 20 in response to the eccentricity of the record 4 and consequently to keep the tracking speed of cartridge 9 from varying on the record 4. Thus, wows will not be generated.

In addition to the above examples, a magnetosensitive element, by way of example, could be used to produce an electrical signal proportional to the rotation angle $\theta$ of pickup arm 6 or rotary shaft 7 to obtain the same effect.

Thus, this invention provides means for detecting the rate of change of the angular position of the tone arm and/or the tone arm supporting shaft; and if this rate of change which is angular velocity remains constant, no eccentricity exists. However, if the angular velocity varies, this indicates eccentricity and the variation is detected and used to control the drive motor of the turntable so as to eliminate audio signal errors.

It will be apparent that many modifications and variations could be effected without departing from the sprit or scope of the novel concepts of the present invention and accordingly the scope of the invention should be determined by the appended claims.

I claim as my invention:

1. In a reproducing apparatus for a disc type record medium having a pickup arm, a rotary shaft rotatably supported and said pickup arm mounted thereon, and a turntable having a spindle adapted to rotate a disc type record medium which is scanned by a pickup on said pickup arm, comprising:
    a. first means producing an output signal proportional to the instantaneous angular position of the pickup arm, the output signal including a component proportional to the eccentricity of the record medium or the spindle;
    b. second means receiving the output of said first means and detecting said component proportional only to the eccentricity of the record medium or the spindle and producing an output signal proportional thereto;
    c. third means for controlling the rotational speed of the turntable in response to the output signal of the second means, and wherein said first means comprises a variable capacitor associated with said rotary shaft, an oscillator whose oscillating frequency is controlled by the angular position of the variable capacitor, and a detector supplied with the output signal of said oscillator and producing a control signal having a component proportional to the eccentricity of the record medium or the spindle; and said second means comprises a filter circuit for detecting said component in the output signal of said detector, and a variable gain amplifier receiving the output of said filter means and increasing the amplitude of said component proportional to the angular position of the pickup arm.

2. A reproducing apparatus for a disc type record medium according to claim 1 wherein said third means includes a motor for driving said turntable, and an automatic speed control circuit for said motor which receives an input from said variable gain amplifier.

3. A reproducing apparatus for a disc type record medium according to claim 2, wherein said automatic speed control circuit includes a frequency generator for detecting the angular velocity of said motor, an FM detector receiving the output of said frequency generator and converting frequency shifts of said frequency generator into a DC voltage, a reference voltage source and a comparator comparing the DC voltage of said FM detector and an output of said reference voltage source, and the output signal of said comparator connected to said motor to control the angular velocity of the motor.

4. In a reproducing apparatus for a disc type record medium having a pickup arm, a rotary shaft rotatably supported and said pickup arm mounted thereon, and a turntable having a spindle adapted to rotate a disc type record medium which is scanned by a pickup on said pickup arm, comprising:
    a. first means producing an output signal proportional to the instantaneous angular position of the pickup arm, the output signal including a component proportional to the eccentricity of the record medium or the spindle;
    b. second means receiving the output of said first means and detecting said component proportional only to the eccentricity of the record medium or the spindle and producing an output signal proportional thereto;
    c. third means for controlling the rotational speed of the turntable in response to the output signal of the second means, and wherein said first means comprises a shutter connected to said rotary shaft, a light source and a photo-electric pickup element mounted on each side of said shutter opposite each other, and an output signal of said photo-electric pickup element supplied to said second means.

5. A reproducing apparatus for a disc type record medium according to claim 4 wherein said shutter is shaped that the radius decreases proportional to the angular position of the pickup arm.

6. Apparatus for eliminating distortion in the output of the audio of a record player having eccentricity between a record and the turntable comprising; motor means driving said turntable, a pickup arm with means for following the sound track on said pickup arm, a shaft rotatably supported by said record player and said pickup arm supported by said shaft, signal means mounted on said record player for detecting changes in angular velocity of said shaft caused only by eccentricity between said record and said turntable, a motor control circuit supplying a substantially constant drive voltage, adder means receiving the output of said motor control circuit and said signal means and supplying an input to said motor means to vary its speed as a function of the output of said signal means, and including a feedback loop including means detecting the instantaneous velocity of said motor means, and a combining means receiving the output of said detecting means and combining it in opposite sense to the output of said adder means.

7. Apparatus for eliminating distortion in the output of the audio of a record player having eccentricity between a record and the turntable comprising; motor means driving said turntable, a pickup arm with means for following the sound track on said pickup arm, a shaft rotatably supported by said record player and said pickup arm supported by said shaft, signal means mounted on said record player for detecting changes in angular velocity of said shaft caused only by eccentricity between said record and said turntable, a motor control circuit supplying a substantially constant drive voltage, adder means receiving the output of said motor control circuit and said signal means and supplying an input to said motor means to vary its speed as a function of the output of said signal means, and wherein said signal means includes a capacitor with a pair of plates with one mounted on said shaft and the other on said record player, a variable frequency oscillator receiving the output of said capacitor and its frequency controlled thereby, a high pass filter, a low pass filter; said filter receiving the output of said oscillator, and a variable gain amplifier receiving the output of said high pass filter and the output of said low pass filter connected to the gain control of said variable gain amplifier.

8. Apparatus according to claim 7 including a detector connected between said variable frequency oscillator and said high and low pass filters.

9. Apparatus for eliminating distortion in the output of the audio of a record player having eccentricity between a record and the turntable comprising; motor means driving said turntable, a pickup arm with means for following the sound track on said pickup arm, a shaft rotatably supported by said record player and said pickup arm supported by said shaft, signal means mounted on said record player for detecting changes in angular velocity of said shaft caused only by eccentricity between said record and said turntable, a motor control circuit supplying a substantially constant drive voltage, adder means receiving the output of said motor control circuit and said signal means and supplying an input to said motor means to vary its speed as a function of the output of said signal means, and wherein said signal means includes a fan shaped shutter with its apex mounted to said shaft and formed with a radius continuously varying at a constant rate, photoelectric means mounted on the opposite sides of said shutter and producing an electrical signal with an A.C. component proportional to eccentricity between said record and turntable and a band pass filter receiving the output of said photo-electric means.

* * * * *